(12) United States Patent
Klein et al.

(10) Patent No.: US 8,984,127 B2
(45) Date of Patent: Mar. 17, 2015

(54) DIAGNOSTICS INFORMATION EXTRACTION FROM THE DATABASE SIGNALS WITH MEASURELESS PARAMETERS

(71) Applicant: Oracle International Corporation, Redwood City, CA (US)

(72) Inventors: Jonathan D. Klein, Redwood Shores, CA (US); Aleksey M. Urmanov, San Diego, CA (US); Anton A. Bougaev, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 199 days.

(21) Appl. No.: 13/663,945

(22) Filed: Oct. 30, 2012

(65) Prior Publication Data
US 2014/0122692 A1    May 1, 2014

(51) Int. Cl.
*G06F 15/173* (2006.01)
*G06F 11/30* (2006.01)

(52) U.S. Cl.
CPC .......... *G06F 15/173* (2013.01); *G06F 11/3096* (2013.01)
USPC ....................................... 709/224

(58) Field of Classification Search
USPC ....................................... 709/224
See application file for complete search history.

(56) References Cited

U.S. PATENT DOCUMENTS

| 7,660,775 B2 | 2/2010 | Bougaev et al. |
| 2009/0281752 A1* | 11/2009 | Ishida .............................. 702/71 |

OTHER PUBLICATIONS

N. E. Huang et al., "The empirical mode decomposition and the Hilbert spectrum for nonlinear and non stationary time series analysis," Proc. Royal Soc. London A, vol. 454, pp. 903-995, 1998 (97 pages).

* cited by examiner

*Primary Examiner* — Tu Nguyen
(74) *Attorney, Agent, or Firm* — Osha Liang LLP (57) ABSTRACT

In general the invention relates to a method for processing signals from a data server. The method includes obtaining, by a monitoring facility, a measured signal from the data server, wherein the monitoring facility comprises a central processing unit, generating a first probing characteristic from the measured signal, and determining that the first probing characteristic is measureless. The method further includes decomposing, by the central processing unit in response to the determination, the first probing characteristic into a plurality of component parts, constructing a reconstructed signal using a first one of the plurality of component parts, generating a second probing characteristic using the reconstructed signal, wherein the second probing characteristic is not measureless, and processing the reconstructed signal by the monitoring facility.

12 Claims, 9 Drawing Sheets

DIAGNOSTICS INFORMATION EXTRACTION FROM THE DATABASE SIGNALS WITH MEASURELESS PARAMETERS

BACKGROUND

Modern computer service providers rely on data servers and other complex computer systems to provide a variety of essential functions. These systems must be constantly monitored for abnormal behavior that can quickly escalate into major system issues. However, many of these systems are monitored for a large number of various metrics. Detecting abnormalities in such large streams of data can be onerous. Further, once an abnormality is discovered, a system administrator may have very little time to decide how to handle the abnormality.

SUMMARY

In general, in one aspect, the invention relates to a method for processing signals from a data server. The method includes obtaining, by a monitoring facility, a measured signal from the data server, wherein the monitoring facility comprises a central processing unit, generating a first probing characteristic from the measured signal, and determining that the first probing characteristic is measureless. The method further includes decomposing, by the central processing unit in response to the determination, the first probing characteristic into a plurality of component parts, constructing a reconstructed signal using a first one of the plurality of component parts, generating a second probing characteristic using the reconstructed signal, wherein the second probing characteristic is not measureless, and processing the reconstructed signal by the monitoring facility.

In general, in one aspect, the invention relates to a non-transitory computer readable medium comprising instructions that, when executed by a processor, perform a method for processing signals from a data server. The method includes obtaining, by a monitoring facility, a measured signal from the data server, wherein the monitoring facility comprises a central processing unit, generating a first probing characteristic from the measured signal, and determining that the first probing characteristic is measureless. The method further includes decomposing, by the central processing unit in response to the determination, the first probing characteristic into a plurality of component parts, constructing a reconstructed signal using a first one of the plurality of component parts, generating a second probing characteristic using the reconstructed signal, wherein the second probing characteristic is not measureless, and processing the reconstructed signal by the monitoring facility.

In general, in one aspect, the invention relates to a system that includes a monitoring facility. The monitoring facility is configured to obtain a measured signal from the data server, wherein the monitoring facility comprises a central processing unit, generate a first probing characteristic from the measured signal, and determine that the first probing characteristic is measureless. The monitoring facility is further configured to decompose, in response to the determination, the first probing characteristic into a plurality of component parts, construct a reconstructed signal using a first one of the plurality of component parts, generate a second probing characteristic using the reconstructed signal, wherein the second probing characteristic is not measureless, and process the reconstructed signal.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for monitoring database (DB) parameters. Specifically, embodiments of the invention may be used to extract meaningful information from DB parameters which lack meaningful mean and/or variance value estimates.

In a DB, as in any complex system, there is a class of diagnostic variables that are characterized by a wide range of variance in values. Further, such outlying values may manifest themselves suddenly. Such variables often have underlying statistical distributions with infinite (or non-existing) moments. However, the measured values of such variables may still contain valuable information about the DB from a monitoring and diagnostics viewpoint. Classical monitoring and diagnostic approaches applied to such variables fail to leverage the knowledge about the statistical distribution properties, (primarily the mean and variance). Moreover, standard monitoring methods applied to such classes of variables likely result in an unacceptably high rate of false or missed alarms, and dramatically reduce the efficacy of diagnostic solutions. Embodiments of the invention may be used as a mechanism for classifying such variables and for extracting important diagnostic information from them.

Figure 1:
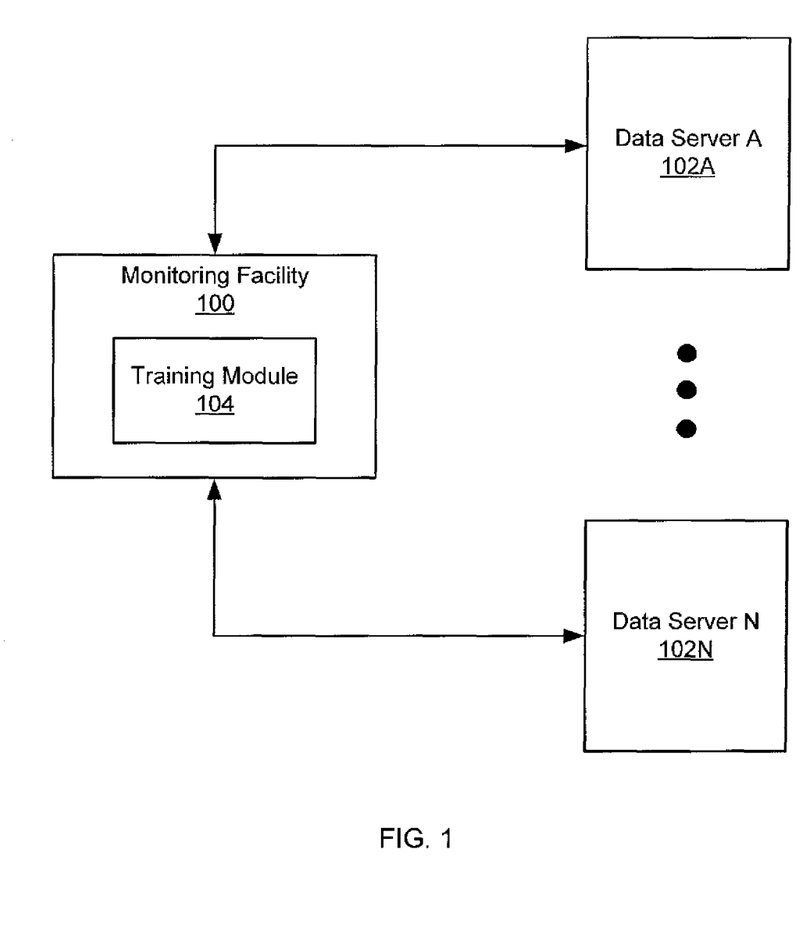
FIG. 1 shows a system in accordance with one or more embodiments of the invention.

FIG. 1 shows a diagram of a system in accordance with one or more embodiments of the invention. As shown in FIG. 1, a monitoring facility (100) is communicatively connected to multiple data servers (data server A (102A), data server N (102N)). The monitoring facility (100) includes a training module (104).

In one or more embodiments of the invention, the monitoring facility (100) is a computer system or group of computer systems configured to monitor one or more data servers (data server A (102A), data server N (102N)). In one or more embodiments of the invention, the monitoring facility (100)

may be implemented as part of a computer system or group of computer systems configured to manage a set of computer systems, such as within an enterprise network.

In one or more embodiments of the invention, the monitoring facility (100) is configured to deploy data gathering software processes (referred to as probes) on one or more data servers (data server A (102A), data server N (102N)). Such probes may be deployed to measure one or more data server elements on the data server (data server A (102A), data server N (102N)). As used herein, the term data server element refers to a measurable hardware or software component of a data server (data server A (102A), data server N (102N)). Such measurable components include, but are not limited to, a central processing unit (CPU), memory, storage, network stack, and operating system kernel.

In one embodiment of the invention, a probe measures one or more aspects related to a data server element. In one embodiment of the invention, a signal is a set of measurements of a data server element obtained by a probe and relayed back to the monitoring facility (100). In one embodiment of the invention, a signal is a measurement of time (e.g., the amount of time a task takes), a measurement of usage (e.g., percentage of memory used), or a measurement of an amount (e.g., number of tasks waiting to execute). Other types of signals may be used without departing from the invention. Specific examples of signals include, but are not limited to, percent of archive area used, average file read/write time, broken job count, percent of lock limit usage, service CPU time per user call, service response time per user call, deferred transaction count, dump area used, percent of buffer cache hit, CPU usage per second, CPU usage per transaction, percent of cursor cache hit, data dictionary hit, percent of database CPU time, global cache average convert time, percent of standard query language (SQL) response time, percent of Java pool free, percent of hypertext transfer protocol (HTTP) 200s responses, requested handling time for a module, requested handling throughput for a module, active http connections, response data throughput, database management system job processing time, database management system job updown, job dispatcher job step average backlog, job dispatcher processing time, rows per hour of the loader throughput, notification processing time, number of roles, percent of CPU consumption, number files open, number threads created, percent of resident memory utilization, virtual memory utilization, and virtual memory utilization growth.

In one embodiment of the invention, the monitoring facility (100) includes a training module (104). In one embodiment of the invention, the training module (104) is a process or group of processes configured to obtain a set of signals and generate a normal system behavior based on the set of signals. In one embodiment of the invention, normal system behavior is a model by which current or historic system behavior (e.g., incoming probing characteristics) is compared. Based on the comparison to the normal system behavior, the current system behavior or historic system behavior may be determined as within the expected bounds (i.e., consistent with normal system behavior) or outside the expected bounds (i.e., inconsistent with normal system behavior). Normal system behavior may be determined on a signal-by-signal basis, or may be determined based on a combination of signals.

In one or more embodiments of the invention, the data servers (data server A (102A), data server N (102N)) are computer systems or groups of computer systems configured to provide data and or applications to connected clients (not shown). In one embodiment of the invention, the data servers (data server A (102A), data server N (102N)) include multiple data server elements which are monitored by probes. In one or more embodiments of the invention, the data servers (data server A (102A), data server N (102N)) may be implemented as database servers hosting databases.

In one or more embodiments of the invention, the monitoring facility (100) is connected to the data servers (data server A (102A), data server N (102N)) via a connection. The connection may be a network connection (e.g., a local area network (LAN), the Internet, etc.), a direct connection, or any combination thereof.

Figure 2:
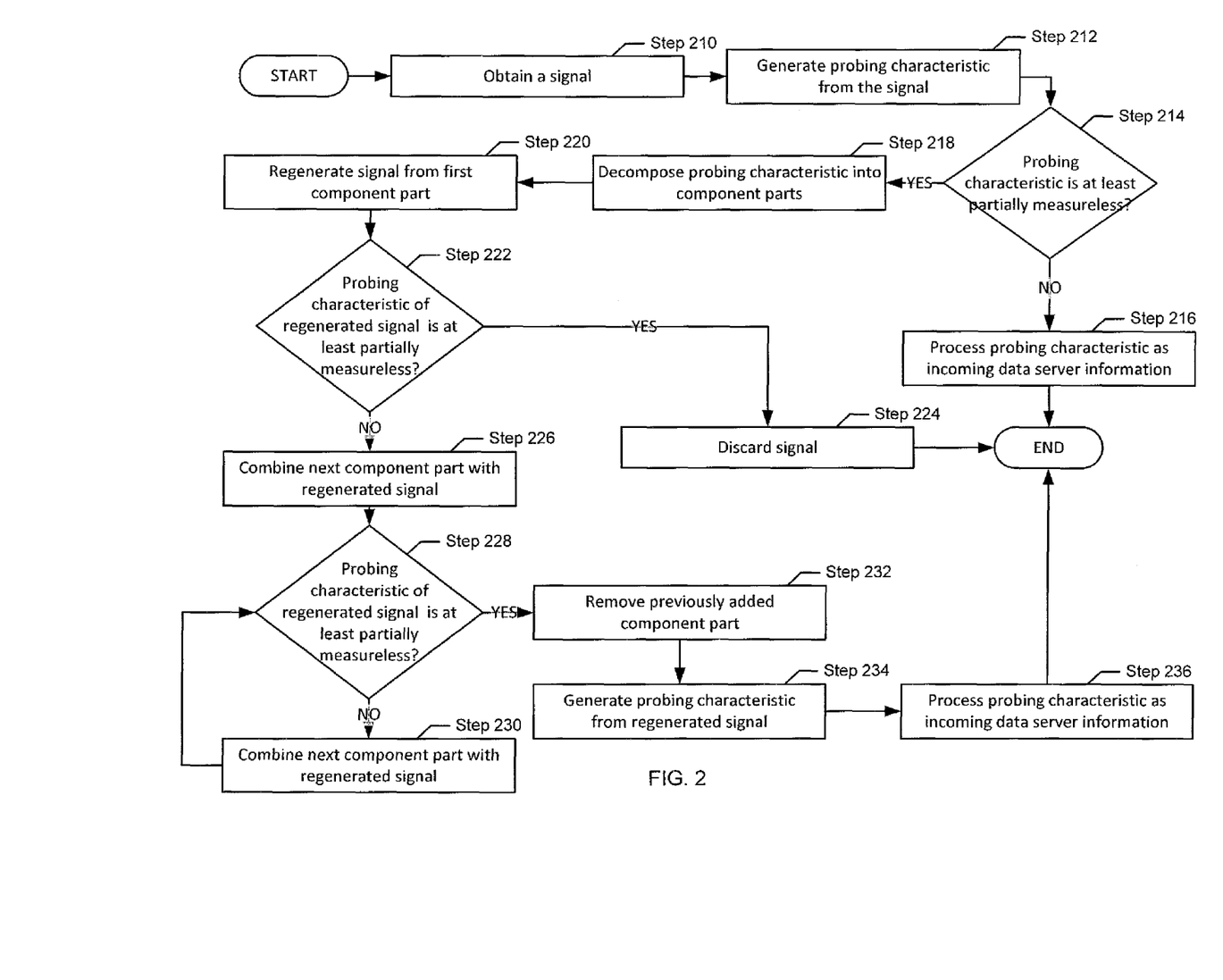
FIG. 2 shows a flow diagram in accordance with one or more embodiments of the invention.

FIG. 2 shows a flowchart for obtaining incoming data server information in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 210, the monitoring facility obtains a signal from a probe executing on the data server. In Step 212, the monitoring facility generates a probing characteristic from the signal. In one embodiment of the invention, a data-generating model is built from the observed data. Specifically, the monitoring facility may estimate moments (e.g., mean and variance) for the signal, and use the moments as parameters for a data-generating model in the form of probability distribution (e.g., Normal distribution, Weibull distribution, or more sophisticated non-parametric models). In one embodiment of the invention, a non-parametric model may be built by classifying data using R-functions. The resulting data-generating model represents the mechanism of a properly functioning element of a data server. In one embodiment of the invention, this data-generating model is referred to as a probing characteristic.

In Step 214, the monitoring facility determines whether the probing characteristic includes infinite moments. In one embodiment of the invention, one type of probing characteristic may have attributes admitting the existence of moments of any order. For example a probing characteristic may follow a Normal distribution with moments of any order existing and being finite (i.e., measurable). For probing characteristics with Normal distribution, the moment of the first order (m1) is its mean, and is computed as $m1=E(X^1)=\mu$, where E is the expected value of a given measurement X, and $\mu$ is the first order moment. The second order moment (m2) is computed as $m2=_E(X^2)=\mu^2+\sigma^2$, where $\sigma$ is the standard deviation. The third-order moment (m3) is computed as $m3=E(X^3)=\mu^3+3\mu\sigma^2$ (and so on for any order moment).

In one embodiment of the invention a second type of probing characteristics may have attributes which admit the existence of only a few moments. In other words, some probing characteristics may have moments that, when computed, are infinite. For example, a probing characteristic that follows the Generalized Extreme Value (GEV) distribution and has a shape parameter (K), the moments of order less than or equal to 1/K are infinite.

In one embodiment of the invention, a third type of probing characteristics may have attributes which do not admit of existence of any moments. In other words, all moments calculated for such probing characteristics are infinite. For example all moments of a probing characteristic that follows the Cauchy-Lorentz distribution are infinite.

Continuing with Step 214, the monitoring facility determines whether the probing characteristic is at least partially measureless (e.g., includes infinite moments and may be classified as the second or third type of probing characteristic discussed above). In one embodiment of the invention, classifying probing characteristics into one of three types is based on an estimation of the shape parameter of the Generalized Extreme Value (GEV) distribution. The cumulative distribution function of the GEV distribution has the following form: $F(x; \mu, \sigma, \lambda) = \exp\{-(1+\lambda\mu(x-\mu)/\sigma)^{\wedge}(-1/\lambda)\}$. Given a sample of observations of a probing characteristic, the shape parameter $\lambda$ is estimated. If $\lambda$, is greater than or equal to one, the probing characteristic is classified as including only infinite moments, and is therefore measureless. If $\lambda$, is greater than or equal to 1/K, the probing characteristics is determined as having some moments that are infinite, and is classified as partially-measureless. All other probing characteristics are determined not to have measureless moments, and are classified as well-behaved.

If at Step 214, the probing characteristic is determined to not be measureless (e.g., includes no infinite moments), then at Step 216, the probing characteristic is processed directly as incoming data server information. Specifically, the probing characteristic is utilized for training or monitoring purposes, as described in FIG. 3.

If at Step 214, the probing characteristic is determined to be at least partially measureless (e.g., includes at least some infinite moments), then at Step 218, the signal making up the probing characteristic is decomposed into component parts. In one embodiment of the invention, the signal making up the probing characteristic is decomposed using empirical mode decomposition (EMD). Using EMD, the signal is decomposed into intrinsic modes. Each of the EMD components has a well-defined instantaneous frequency and a local mean equal to zero. The signal may be decomposed using alternative methods without departing from the invention.

In one embodiment of the invention, decomposing the signal may result in residual signals that remain after the rest of the signal has been decomposed. In one embodiment of the invention, this residual signal may be used to detect a change in the observed signal. For example, a residual signal may be flat, indicating that no change in the signal is detected. Alternatively, a residual signal may fluctuate, indicating that the signal has changed (indicating a change in the behavior of the data server).

At Step 220, the monitoring facility regenerates the signal using a first component part. In one embodiment of the invention, the $\lambda$, (shape parameter) for one or more of the component parts is estimated. A first component part may then be selected from among the component parts whose $\lambda$, estimations are less than 1/K. At Step 222, the monitoring facility generates a probing characteristic for the regenerated signal, and determines whether the probing characteristic is at least partially measureless. In one embodiment of the invention, the monitoring facility generates a probing characteristic for each single component part of the regenerated signal to make the determination at Step 222. If at Step 222, the monitoring facility determines that the probing characteristic from a first component part (or any single component part of the regenerated signal) is at least partially measureless, then at Step 224, the signal is discarded.

If at Step 222, the monitoring facility determines that the probing characteristic from a first component part (or any single component part of the regenerated signal) is not at least partially measureless, then at Step 226, a second component is added to the regenerated signal. At Step 228, a probing characteristic for the combined regenerated signal is generated, and the monitoring facility determines whether the probing characteristic is at least partially measureless. If at Step 228, the monitoring facility determines that the probing characteristic from the combined component parts is not at least partially measureless, then at Step 230, another component part is added to the regenerated signal.

If at Step 228, the monitoring facility determines that the probing characteristic from the combined component parts is at least partially measureless, then at Step 232, the signal is regenerated without the last-added component part. At Step 234, the regenerated signal is used to generate a probing characteristic. At Step 236, the probing characteristic is processed as incoming data server information.

In one embodiment of the invention, once a measureless probe characteristic is decomposed into component parts, the components that are causally related to the measureless nature of the probing characteristic can be identified and excluded from the reconstruction of the probing characteristic. By excluding the offending component part from the reconstruction, a well-behaved approximation of the measureless probing characteristics may be obtained.

Figure 3:
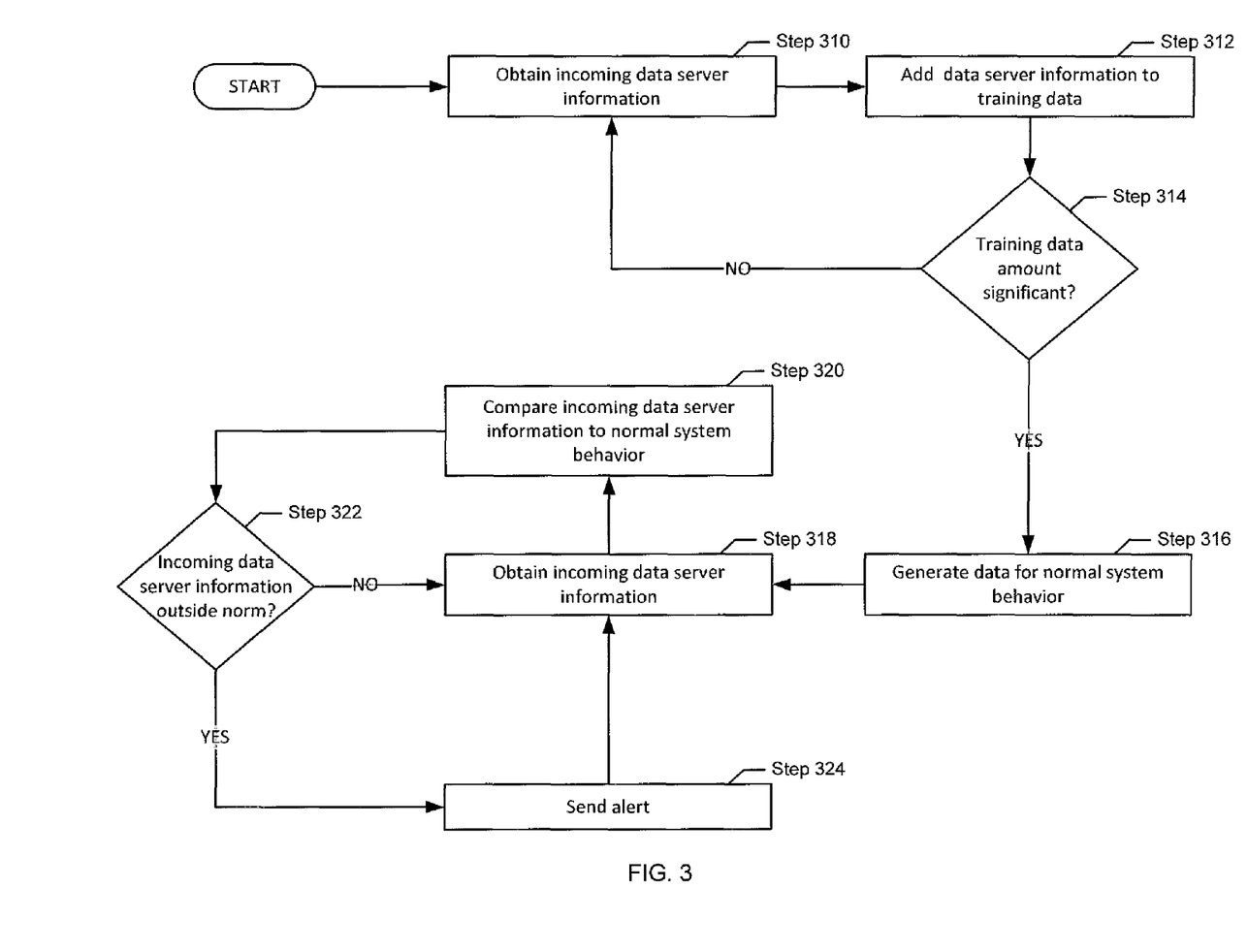
FIG. 3 shows a flow diagram in accordance with one or more embodiments of the invention.

FIG. 3 shows a flowchart for processing incoming data server information in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

Steps 310-316 describe the training phase of monitoring a data server in accordance with one or more embodiments of the invention. At Step 310, the training module obtains incoming data server information. In one embodiment of the invention, the incoming data server information for an element is obtained using the process described in FIG. 2. At Step 312 the data server information is added to training data. In one embodiment of the invention, the training data is collected to generate a normal system behavior. In one embodiment of the invention, training data is made up of a robust set of probing characteristics taken during a period of sustainable (i.e., healthy) data server operation.

At Step 314, the training module determines whether the amount of training data obtained is significant. In one embodiment of the invention, the monitoring facility requires a significant amount of training data before a normal system behavior can be determined. In one embodiment of the invention, a signification amount of training data may be a predetermined number of measurements of a signal. In one embodiment of the invention, a significant amount may be a predetermined amount of time spent observing the data server.

In one embodiment of the invention, during the training phase or adaptation phase the monitoring facility first identifies the type of the characteristic and deploys necessary means of responding to an indication that the probing characteristic is inconsistent with the normal system behavior (e.g., shift a portion of the processing load to another data server if the CPU gets over-utilized). Continued training may be required when previously unseen cases are encountered (e.g., due to the use of new features not previously used, new deployment specifics, environment conditions, etc.).

If at Step 314, the amount of training data is not significant, then the process returns to Step 310 to obtain further data server information. If at Step 314, the training module determines that the amount of training data is significant, then at Step 316, the training module generates a model for normal system behavior.

Steps 318-324 describe monitoring a data server in accordance with one or more embodiments of the invention. At Step 318, the monitoring facility again receives incoming data server information. At Step 320, the incoming data server information is compared against the normal system behavior model determined by the training module. At Step 322, the monitoring facility determines whether the incoming data server information is outside the normal system behavior model. In one embodiment of the invention, the monitoring facility also obtains a residual signal generated from deconstructing a measureless or partially measureless probing characteristic from the incoming server information, and compares the residual signal to an expected residual signal (such as a residual signal that lacks any fluctuation) determined from the normal system behavior model.

If at Step 322, the monitoring facility determines that the incoming data server information is consistent with the normal system behavior model, then the process returns to Step 318 to obtain further data server information. In one embodiment of the invention, determining that the incoming data server information is consistent with the normal system behavior may include comparing a probing characteristic of the incoming data server information to its counterpart (i.e., a probing characteristic of the same data server signal) from the normal system behavior model. If at Step 322, the monitoring facility determines that the incoming data server information is not consistent with the normal system behavior model, then at Step 324, the monitoring facility generates an alert.

In one embodiment of the invention, the monitoring facility classifies the current observations into ones representing either normal system operation or ones representing a degraded operation. When an observation is classified as one representing a degraded operation an alarm is set and a notification or message is produced. The notification is logged and/or communicated to automated decision making system management platform or human operator or system administrator.

In one embodiment of the invention, the alert indicates the system element from which the signal originates and the changes to the signal observed (e.g., based on the comparison to the normal system behavior model). In one embodiment of the invention, generating an alert may include determining that a number of variations have been observed, and the combination of the observed variations is consistent with a certain type of system failure. In one embodiment of the invention, an alert is also generated if a fluctuation in a residual signal is detected.

In one embodiment of the invention, generating an alert may include presenting or sending the alert to a system administrator or other user tasked with observing monitoring the data server or the group of data servers. In one embodiment of the invention, the alert may take the form of a notice presented on the graphical user interface of a client system operatively connected to the monitoring facility. Alternatively, or additionally, the alert may be presented on a user interface of the monitoring facility itself, in an email automatically sent to a system administrator, or in a network message to a mobile device of a system administrator (such as short message service).

Figure 4A:
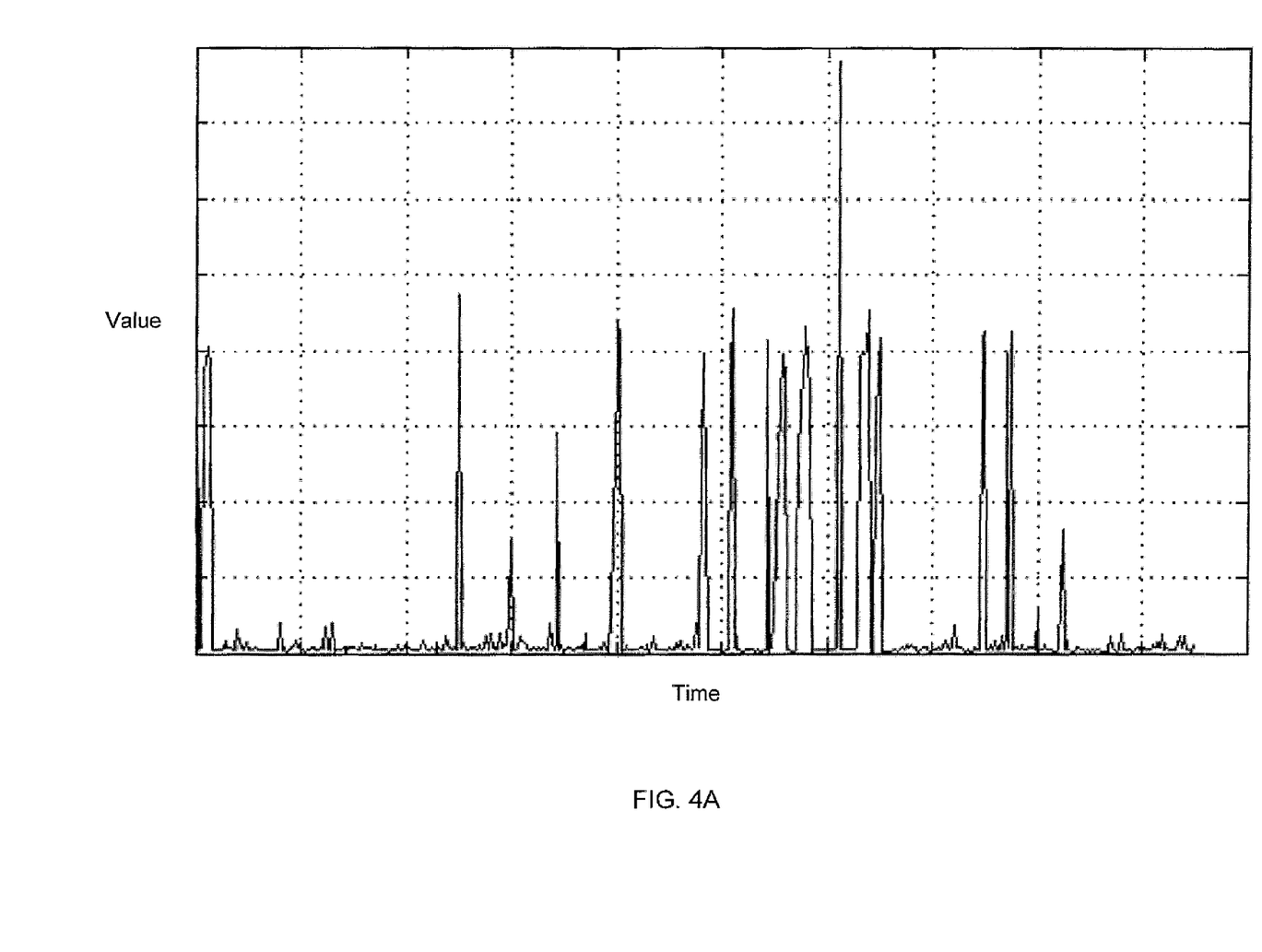
FIGS. 4A-4C show an example in accordance with one or more embodiments of the invention.
Figure 4B:
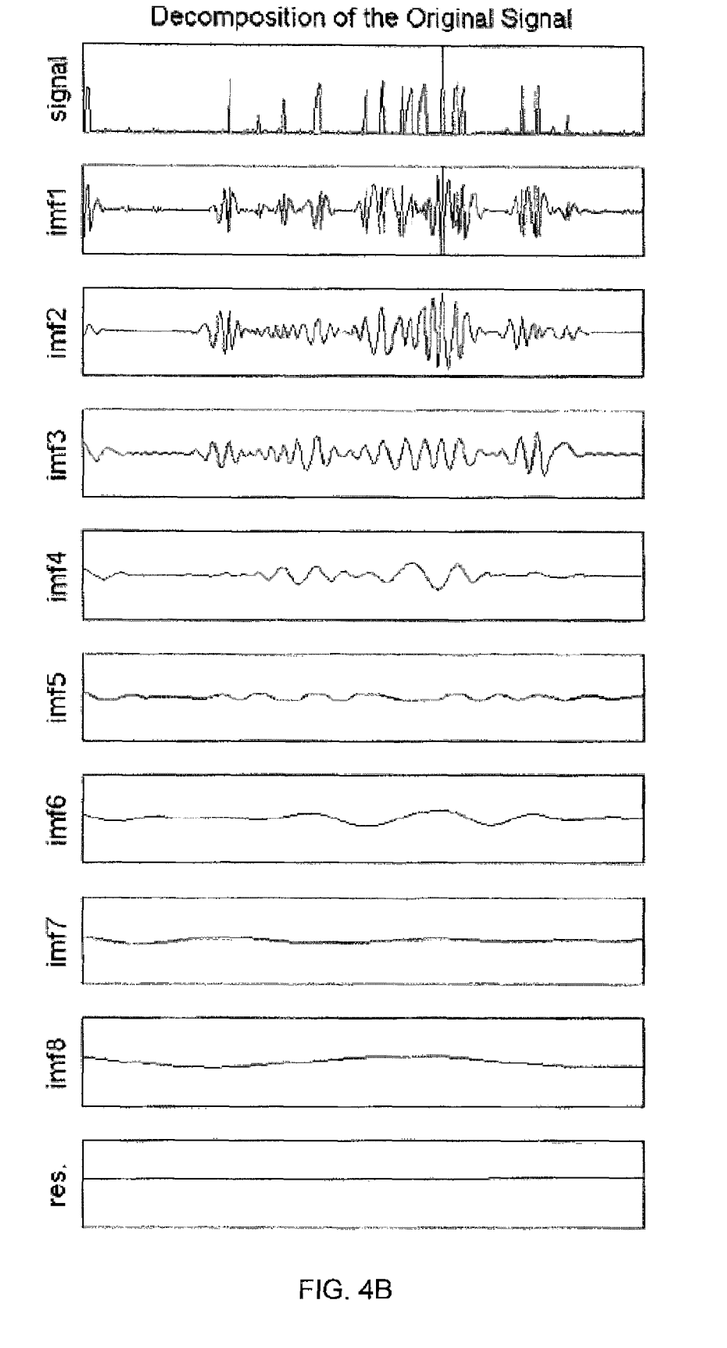

FIG. 4A shows an example of a signal obtained from a data server, in accordance with one or more embodiments of the invention. FIG. 4B illustrates the EMD of an exemplary characteristic depicted in FIG. 4A. The top subplot shows the original characteristic and the rest show individual intrinsic mode functions. The last subplot shows the residual signal.

Figure 4C:
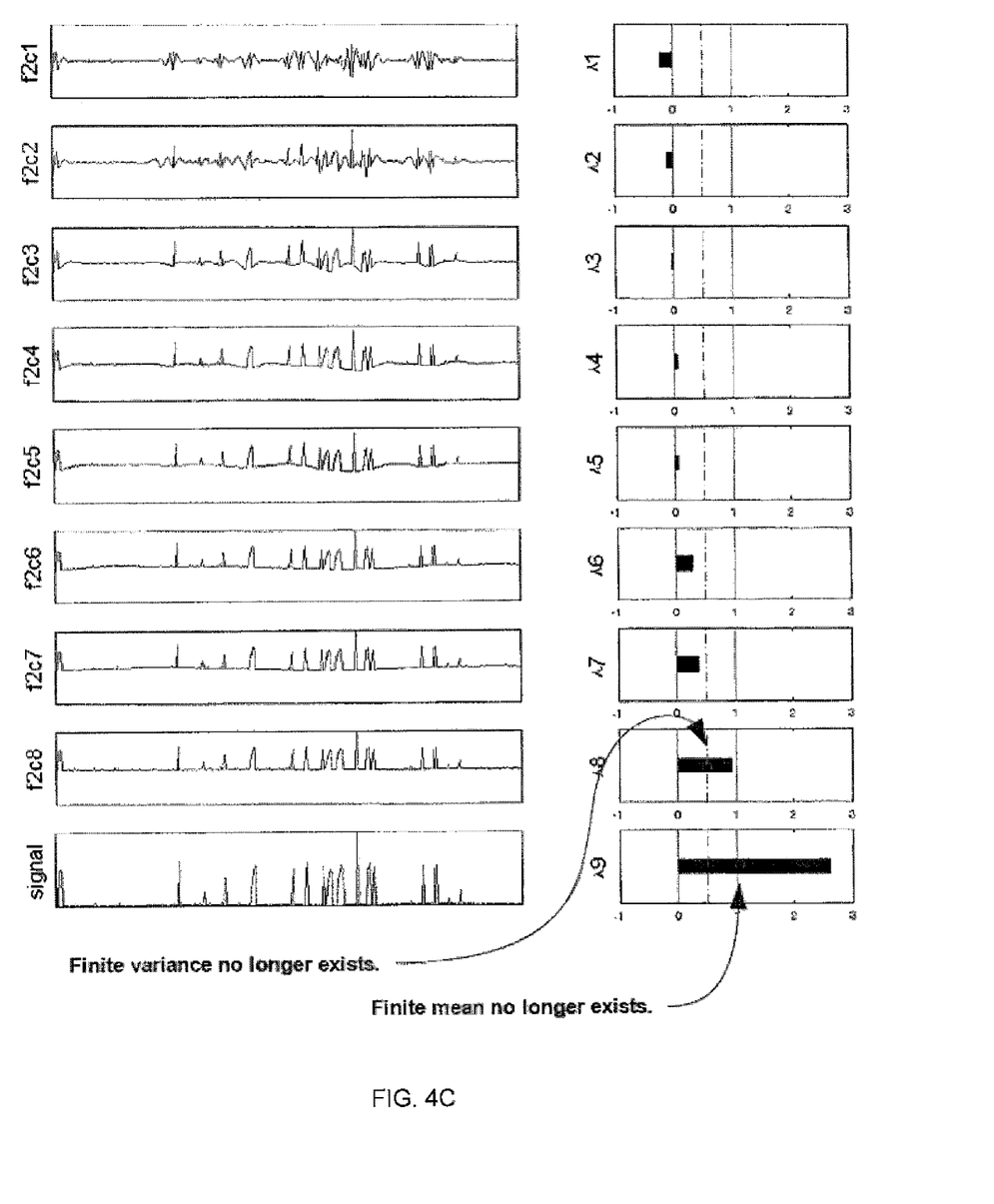

FIG. 4C illustrates the process of reconstructing the probing characteristic from the EMD components depicted in FIG. 4B. During the process of reconstructing the probing characteristic, the troublesome components (i.e., the ones that cause the probing characteristic to become measureless) can be identified. The reconstruction of the probing characteristic using only first 3 components results in a signal wherein $\lambda$ (the shape parameter) is calculated as less than zero (depicted on the horizontal graph plots in the right column). This indicates that the approximated regenerated probing characteristic may follow the Weibull distribution. Adding more components to the reconstruction recovers the original probing characteristic more accurately. However, when the last intrinsic mode function is added, $\lambda$ (the shape parameter) is calculated as being greater than 0.5. By finally adding the residual signal to the reconstruction the reconstructed probing characteristic has no finite moments. Accordingly, the last component part and the residual signal are determined as causing the probing characteristic to become measureless. The approximation of the probing characteristic that does not include the marked components is no longer measureless, and is subsequently provided to the system as incoming data server information.

Figure 5A:
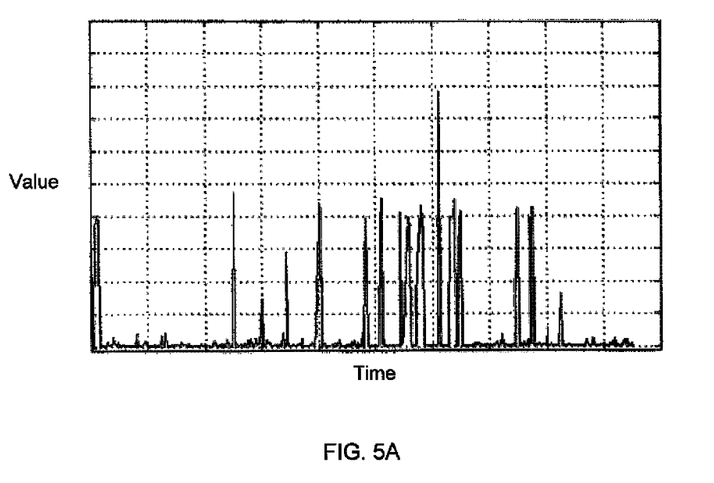
FIGS. 5A-5B show an example in accordance with one or more embodiments of the invention.
Figure 5B:
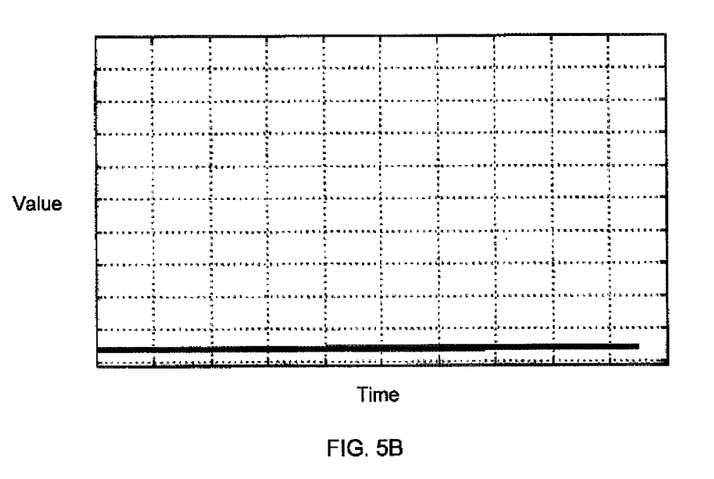

FIGS. 5A and 5B illustrate a variation of the method that uses the residual of the decomposed measureless characteristic as a well-behaved approximation. A change detection model that assumes finite moments of the data generating mechanisms can therefore be deployed on the approximation and successfully detect a systemic change in the probing characteristic which cannot be detected otherwise as no models assuming finite moments could be successfully validated during the training process. FIG. 5A shows the original signal, and FIG. 5B shows the residual signal of the EMD. The residual indicates no fluctuation, which indicates that no change has occurred during the observed period.

Figure 6A:
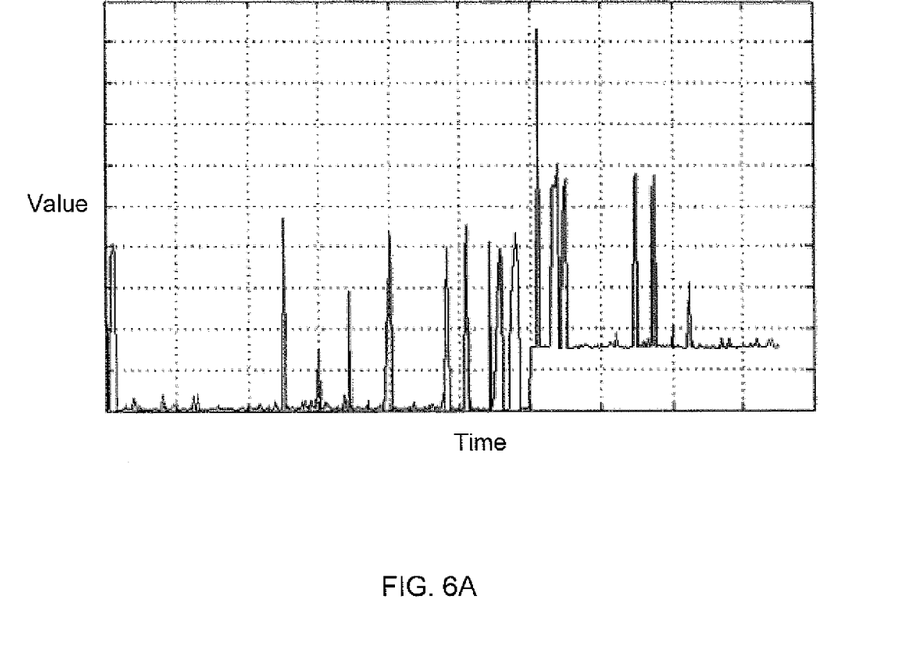
FIGS. 6A-6B show an example in accordance with one or more embodiments of the invention.
Figure 6B:
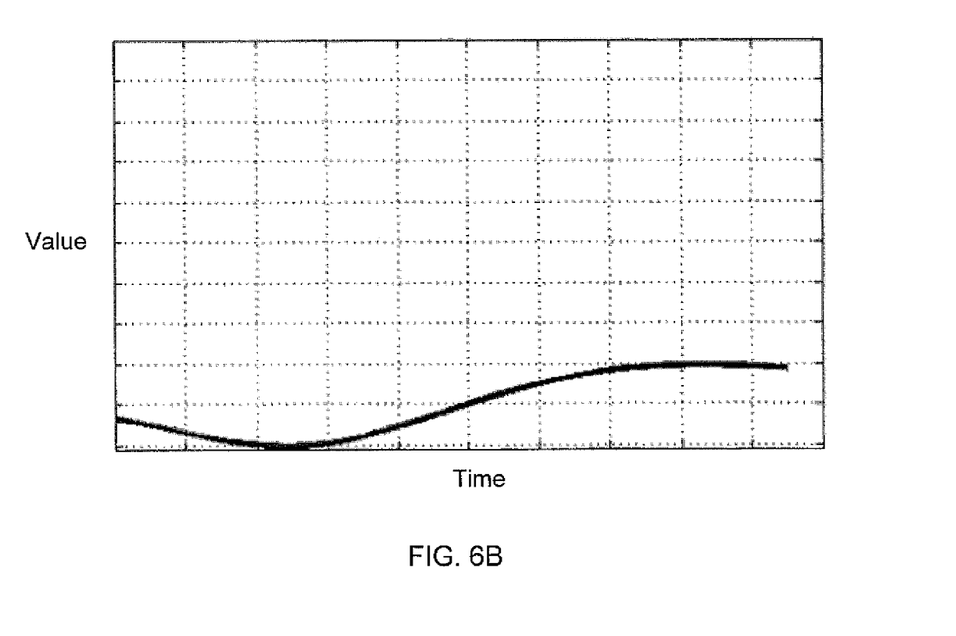

FIGS. 6A and 6B illustrate another variation of the method also using the residual of the decomposed measureless characteristic as a well-behaved approximation. FIG. 6A shows the original signal, and FIG. 6B shows the residual signal. The residual signal clearly indicates the presence of a change in the characteristic over the observed time period. As shown in FIG. 6B, the detection of change becomes well-defined in the revived signal.

Figure 7:
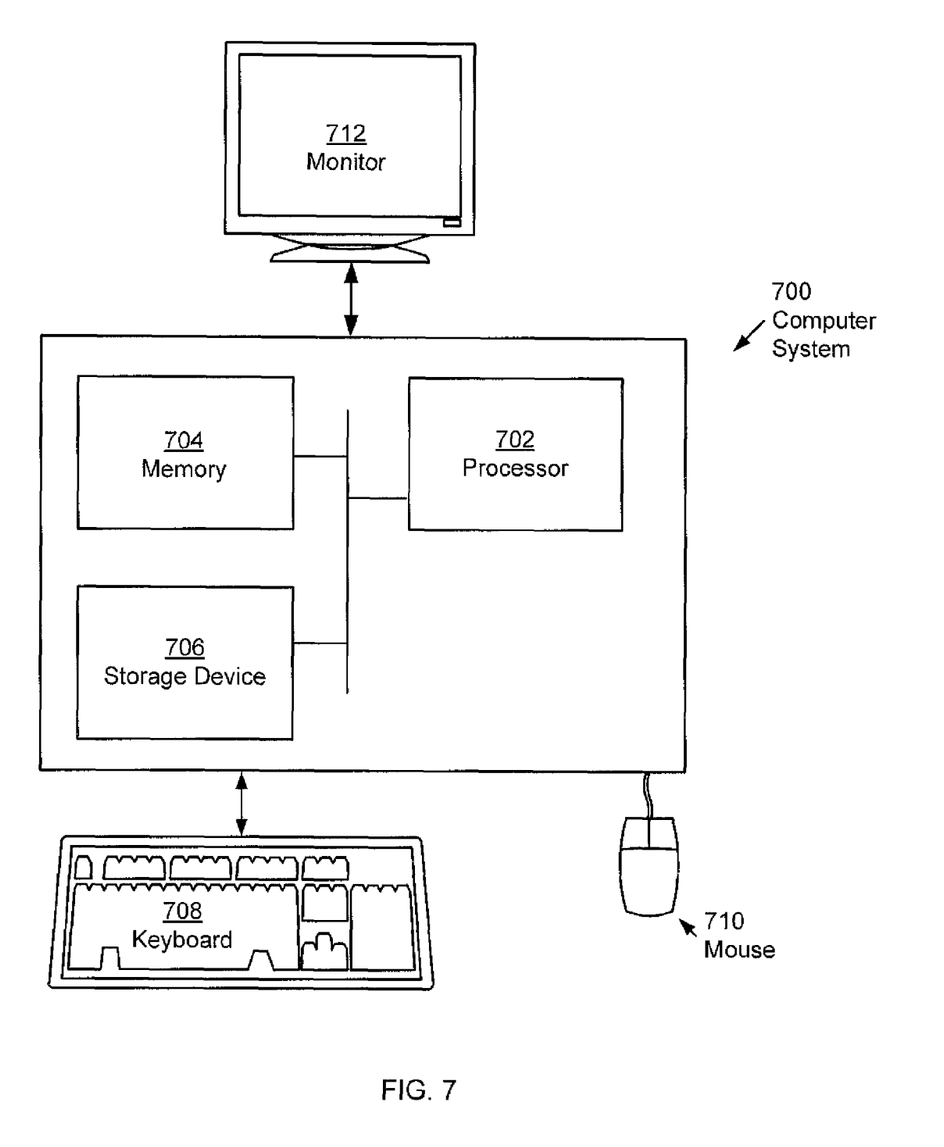
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702) such as a central processing unit (CPU) or other hardware processor (s), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (702) is hardware. For example, the processor may be an integrated circuit. The computer system (700) may also include input means, such as a keyboard (708), a mouse (710), or a microphone (not shown). Further, the computer system (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing diagnostics on a data server element located on a data server comprising:
   deploying, by a monitoring facility, a probe on the data server to measure a performance metric of the data server element, wherein the data server element is at least one selected from a group consisting of a central processing unit (CPU), a memory, a storage unit, a network stack, and an operating system kernel;
   obtaining, by the monitoring facility, a measured signal from the probe on the data server based on the performance metric of the data server element, wherein the monitoring facility is external to the data server;
   generating a first probing characteristic from the measured signal, wherein the first probing characteristic is a data-generating model;
   determining that the first probing characteristic has at least one infinite moment;
   decomposing, by the monitoring facility and in response to the determination, the first probing characteristic into a plurality of component parts;
   constructing a reconstructed signal using a first one of the plurality of component parts;
   generating a second probing characteristic using the reconstructed signal, wherein the second probing characteristic has no infinite moments;
   determining, by the monitoring facility, that the second probing characteristic indicates a deviation from a normal system behavior of the data server element; and
   generating, by the monitoring facility, an alert warning a system administrator of the deviation by the data server element.

2. The method of claim 1, further comprising:
   generating the normal system behavior based on training data.

3. The method of claim 1, wherein constructing the reconstructed signal further comprises:
   iteratively combining each of the plurality of component parts until generating the second probing characteristic using the reconstructed signal results in a measureless probing characteristic; and
   removing the last-added component part from the reconstructed signal.

4. The method of claim 1, wherein generating the first probing characteristic from the measured signal comprises:
   determining a probability distribution of the measured signal.

5. The method of claim 1, wherein the data server comprises a database.

6. A non-transitory computer readable medium comprising instructions that, when executed by a processor, perform a method for performing diagnostics on a data server element located on a data server, the method comprising:
   deploying, by a monitoring facility, a probe on the data server to measure a performance metric of the data server element, wherein the data server element is at least one selected from a group consisting of a central processing unit (CPU), a memory, a storage unit, a network stack, and an operating system kernel;
   obtaining, by the monitoring facility, a measured signal from the probe on the data server based on the performance metric of the data server element, wherein the monitoring facility is external to the data server;
   generating a first probing characteristic from the measured signal, wherein the first probing characteristic is a data-generating model;
   determining that the first probing characteristic has at least one infinite moment;
   decomposing, in response to the determination, the first probing characteristic into a plurality of component parts;
   constructing a reconstructed signal using a first one of the plurality of component parts;
   generating a second probing characteristic using the reconstructed signal, wherein the second probing characteristic has no infinite moments;
   processing the reconstructed signal by a monitoring facility
   determining that the second probing characteristic indicates a deviation from a normal system behavior of the data server element; and
   generating an alert warning a system administrator of the deviation by the data server element.

7. The non-transitory computer readable medium of claim 6, wherein processing the reconstructed signal comprises:
   generating, by the monitoring facility, the normal system behavior based on training data.

8. The non-transitory computer readable medium of claim 6, wherein constructing the reconstructed signal comprises:
   iteratively combining each of the plurality of component parts until generating the second probing characteristic using the reconstructed signal results in a measureless probing characteristic; and
   removing the last-added component part from the reconstructed signal.

9. The non-transitory computer readable medium of claim 6, wherein generating the first probing characteristic from the measured signal comprises:
   determining a probability distribution of the measured signal.

10. The non-transitory computer readable medium of claim 6, wherein the data server comprises a database.

11. A system for performing diagnostics on a data server element located on a data server, comprising:
    a monitoring facility configured to:
      deploy a probe on the data server to measure a performance metric of the data server element, wherein the data server element is at least one selected from a group consisting of a central processing unit (CPU), a memory, a storage unit, a network stack, and an operating system kernel;
      obtain a measured signal from the probe on the data server reflecting the performance metric of the data server element, wherein the monitoring facility is external to the data server;

generate a first probing characteristic from the measured signal, wherein the first probing characteristic is a data-generating model;

determine that the first probing characteristic has at least one infinite moment;

decompose, in response to the determination, the first probing characteristic into a plurality of component parts;

construct a reconstructed signal using a first one of the plurality of component parts;

generate a second probing characteristic using the reconstructed signal, wherein the second probing characteristic has no infinite moments;

determining that the second probing characteristic indicates a deviation from a normal system behavior of the data server element; and generate an alert warning a system administrator of the deviation by the data server element.

12. The system of claim 11, wherein the monitoring facility comprises:

a training module configured to:

generate the normal system behavior based on training data.

* * * * *